(12) United States Patent
Lazzaro

(10) Patent No.: US 10,724,675 B2
(45) Date of Patent: Jul. 28, 2020

(54) PIVOT FLEXURE WITH UNIFORM MOMENT STIFFNESS

(71) Applicant: THE BOEING COMPANY, Chicago, IL (US)

(72) Inventor: Anthony A. Lazzaro, Albuquerque, NM (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/170,865

(22) Filed: Oct. 25, 2018

(65) Prior Publication Data

US 2020/0132248 A1    Apr. 30, 2020

(51) Int. Cl.
*F16M 13/00* (2006.01)
*F16M 13/02* (2006.01)
*B21D 47/01* (2006.01)

(52) U.S. Cl.
CPC .............. *F16M 13/02* (2013.01); *B21D 47/01* (2013.01); *F16M 2200/021* (2013.01)

(58) Field of Classification Search
CPC ........ F16C 11/12; F16F 1/315; F16F 15/1428
See application file for complete search history.

(56) References Cited

U.S. PATENT DOCUMENTS

| | | |
|---|---|---|
| 3,073,584 A | 1/1963 | Troeger |
| 3,124,873 A | 3/1964 | Troeger |
| 3,142,888 A | 8/1964 | Troeger |
| 3,181,851 A | 5/1965 | Troeger |
| 3,181,918 A | 5/1965 | Troeger |
| 3,277,555 A | 10/1966 | Kutash |
| 3,319,951 A | 5/1967 | Seelig |
| 3,811,665 A | 5/1974 | Seelig |

(Continued)

FOREIGN PATENT DOCUMENTS

| | | |
|---|---|---|
| CA | 973900 A | 9/1975 |
| CN | 104791377 A | 7/2015 |

(Continued)

OTHER PUBLICATIONS

EP Search Report for Application No. EP19201638 dated Mar. 9, 2020.

(Continued)

*Primary Examiner* — Amy J. Sterling
(74) *Attorney, Agent, or Firm* — Marshall, Gerstein & Borun LLP

(57) ABSTRACT

Cross beam flexure pivot assembly includes a first housing member having a first arcuate member a second housing member having a second arcuate member wherein the first arcuate member extends into the second housing member and the second arcuate member extends into the first housing member. First, second and, third beams extend in first direction and fourth and fifth beams extend in a second direction all secured to first and second arcuate members. A first axis, second axis and radial axis of the first and second housing members form a common point of intersection. Total of cross section areas of beams extending in first direction and of beams extending in second direction are equal providing equal linear stiffness in both directions. Total moment stiffness about first axis equals total moment stiffness about the second axis.

20 Claims, 9 Drawing Sheets

(56) References Cited

U.S. PATENT DOCUMENTS

| | | | | |
|---|---|---|---|---|
| 4,405,184 A | * | 9/1983 | Bahiman | F16C 11/12 403/291 |
| 5,265,853 A | | 11/1993 | Szirtes | |
| 6,267,363 B1 | * | 7/2001 | Genequand | F16C 11/12 248/567 |
| 7,857,833 B2 | * | 12/2010 | Abdou | A61B 17/7071 606/254 |
| 8,117,943 B2 | * | 2/2012 | Manzoor | F16F 15/1428 464/73 |
| 8,702,337 B2 | * | 4/2014 | Whitney | F16C 11/12 403/220 |
| 8,714,051 B2 | * | 5/2014 | Dopke | F16F 15/315 123/192.1 |
| 2006/0169053 A1 | | 8/2006 | Kahle et al. | |

FOREIGN PATENT DOCUMENTS

| | | |
|---|---|---|
| CN | 105605090 B | 5/2018 |
| FR | 2797923 A1 | 3/2001 |

OTHER PUBLICATIONS

Written Opinion for Application No. 19201638.4 dated Mar. 9, 2020.

\* cited by examiner

PIVOT FLEXURE WITH UNIFORM MOMENT STIFFNESS

FIELD

This disclosure relates to a device which provides support to a mechanism and transmits a limited rotation about an axis to the mechanism and more particularly to a cross beam flexural pivot assembly which provides limited relative rotation between two parts of the cross beam flexural pivot assembly with flexing beam members connecting the two parts.

BACKGROUND

A cross beam flexure pivot assembly is a device which secures to and supports a mechanism and transmits to the mechanism well-defined limited rotational movement about a radial axis of rotation. Cross beam flexure pivot assemblies are used, for example, in supporting a mechanism which requires precise pointing throughout the limited rotation of the mechanism. Cross beam flexure pivot assemblies are configured to avoid friction in a desire to obtain reliable and repeatable pointing throughout the limited rotation. Flexing beam members connect two parts of the cross beam flexure pivot assembly, which have limited rotation relative to one another, such that the two parts are not positioned in frictional contact with one another in the interest of providing precise limited rotation of the supported mechanism in a repeatable plane.

Cross beam pivot flexure assemblies have unequal moment stiffness in different directions with respect to the flexing beams, which can present difficulty, for example, in sustaining precision pointing by the mechanism supported by the cross beam flexure pivot assembly. Cross beam flexure pivot assemblies used, for example, to support a cantilevered load of the mechanism, normally would be designed using the softer direction moment stiffness of a cross beam pivot flexure assembly, requiring a larger or heavier flexure design that can reduce system pointing performance in a precision tracking system. There is a need to provide cross beam flexure pivot assembly support to cantilevered loads such that the cantilevered load can be supported with an optimally sized cross beam pivot flexure allowing maximum pointing performance with a given mass and volume constraint.

SUMMARY

An example of a cross beam flexure pivot assembly includes a first housing member which extends about a radial axis of the cross beam flexure pivot assembly and a second housing member and which extends about the radial axis with the second housing member positioned adjacent to and spaced apart along the radial axis from the first housing member. The first housing member also includes a first arcuate member which extends along a first interior surface of the first housing member. The first arcuate member extends from the first housing member to within the second housing member spaced apart from and along a second interior surface of the second housing member. The second housing member includes a second arcuate member which extends along the second interior surface of the second housing member and the second arcuate member extends from the second housing member to within the first housing member spaced apart from and along the first interior surface of the first housing member. The cross beam flexure pivot assembly also includes a first beam extends in a first direction with a first end of the first beam connected to the first arcuate member and a second end connected to the second arcuate member and with the radial axis of the cross beam flexure pivot assembly extending through a central axis of the first beam. A second beam extends in the first direction with a first end of the second beam connected to the first arcuate member and a second end connected to the second arcuate member, with the radial axis of the cross beam flexure pivot assembly extending through a central axis of the second beam and with the second beam spaced apart along the radial axis of the cross beam flexure pivot assembly from the first beam. A third beam extends in the first direction with a first end of the third beam connected to the first arcuate member and a second end connected to the second arcuate member, with the radial axis of the cross beam flexure pivot assembly extending through a central axis of the third beam and with the third beam spaced apart along the radial axis of the cross beam flexure pivot assembly from the second beam. A fourth beam extends in a second direction transverse to the first direction having a first end of the fourth beam connected to the first arcuate member and a second end connected to the second arcuate member, with the radial axis of the cross beam flexure pivot assembly extending through a central axis of the fourth beam and with the fourth beam positioned between the first and second beams. A fifth beam extends in the second direction having a first end of the fifth beam connected to the first arcuate member and a second end connected to the second arcuate member, with the radial axis of the cross beam flexure pivot assembly extending through a central axis of the fifth beam and with the fifth beam positioned between the second and third beams and with a first axis positioned extending in the first direction through a central axis of the second beam, which intersects the radial axis of the cross beam flexure pivot assembly, and a second axis positioned extending in the second direction, wherein the radial axis, the first axis and the second axis form a common point of intersection; a sum total of a cross section area of the first beam, a cross section area of the second beam and a cross section area of the third beam equals a sum total of a cross section area of the fourth beam and a cross section area of the fifth beam, which provides equal linear stiffness in the first direction and in the second direction; and a sum total of area moments about the first axis for the cross section area of each of the first beam, the second beam and the third beam equals a sum total of area moments about the second axis for the cross section area of each of the fourth beam and the fifth beam, which provides equal moment stiffness about the first axis and the second axis.

The features, functions, and advantages that have been discussed can be achieved independently in various embodiments or may be combined in yet other embodiments further details of which can be seen with reference to the following description and drawings.

DESCRIPTION

Figure 1:
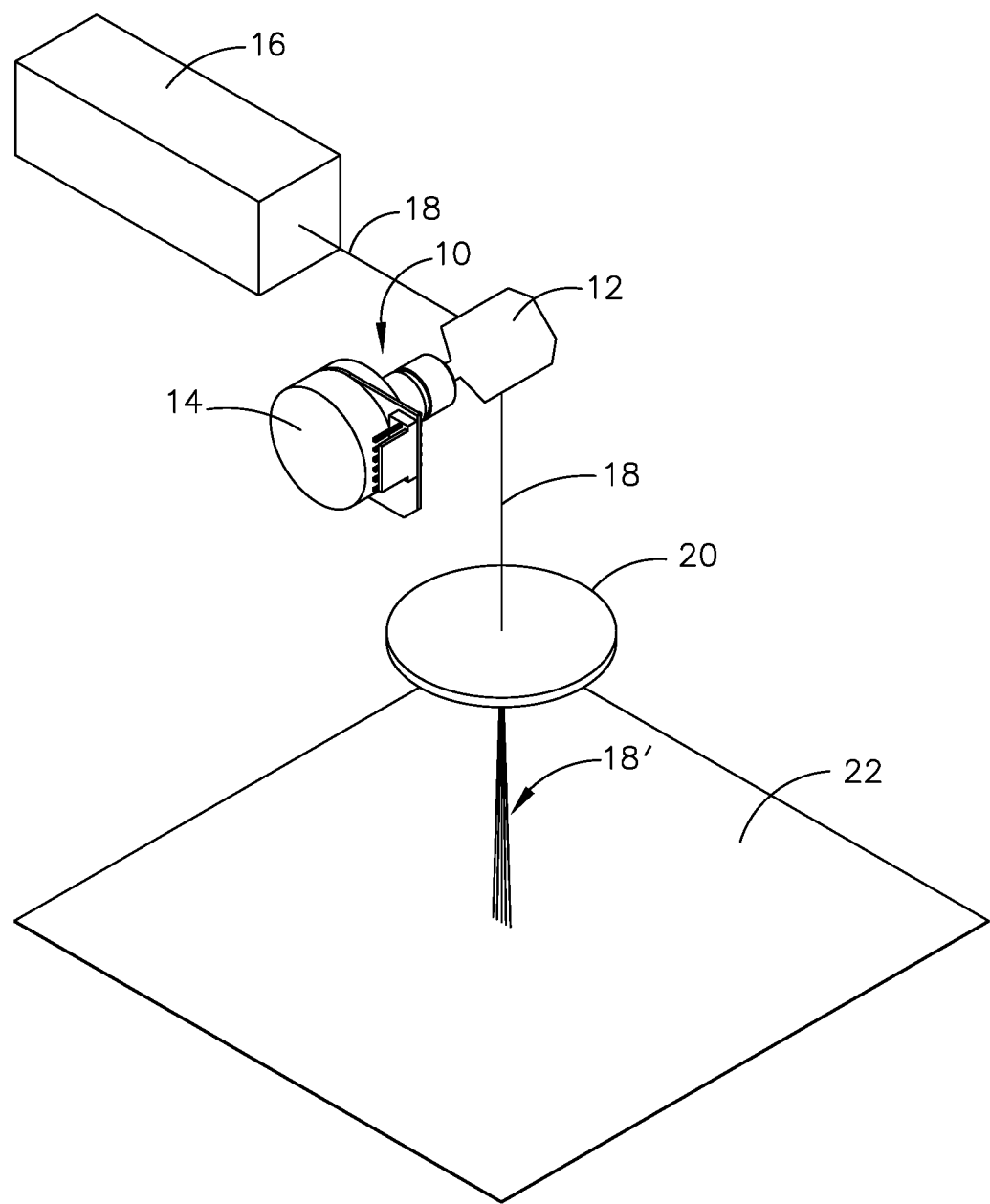
FIG. 1 is a schematic perspective view of an example of employment of a cross beam flexure pivot assembly used for connecting a rotatable mirror to a servo motor for reflecting and directing a laser beam to a desired location.

In referring to FIG. 1, an example is shown of an application of use of cross beam flexure pivot assembly 10. Cross beam flexure pivot assembly 10, in this example, supports scanning mirror 12 in a cantilevered configuration with cross beam flexure pivot assembly 10 connected to servo motor 14. Servo motor 14 transmits limited rotation through cross beam flexure pivot assembly 10 to scanning mirror 12. Laser device 16 emits laser beam 18 to scanning mirror 12. With servo motor 14 imparting limited rotation through cross beam flexure pivot assembly 10 to scanning mirror 12, scanning mirror redirects laser beam 18 as desired. Laser beam 18, in this example, is redirected by scanning mirror 12 to application lens 20 and in turn to target 22. Laser beams 18' are a schematic representation of an example of redirection of laser beam 18 by way of the limited rotational movement imparted to scanning mirror 12.

Cross beam flexure pivot assembly 10, as will be described herein, can support cantilevered loads such as scanning mirror 12 and provide reliable and repeatable pointing which can be provided with optimally sized cross beam pivot flexure assembly 10 allowing maximum pointing performance with given mass and volume constraints. Cross beam flexure pivot assembly 10 provides reliable and repeatable pointing performance with beams, as will be discussed herein, providing equal linear stiffness in an X direction and Y direction as seen in FIGS. 3A-4B and 5 and providing equal moment stiffness about the X direction and Y direction as shown in FIGS. 3A-4B, 6A and 6B. Designation of X direction also refers to an X axis in this example and Y direction also refers to a Y axis in this example. The X and Y directions are positioned transverse to one another and are also positioned transverse to Z direction. Z direction also refers to Z or radial axis of cross beam flexure pivot assembly 10 for this example. With beams providing equal linear stiffness and equal moment stiffness, reliable and repeatable pointing performance can be achieved for cross beam flexure pivot assembly 10 with given mass and volume constraints with respect to cross beam flexure pivot assembly 10. The equal linear stiffness with respect to the X direction and Y direction and the equal moment stiffness about the X or first axis and about the Y or second axis can be achieved by utilizing different lengths, thicknesses and material compositions of each beam. In the example of cross beam flexure pivot assembly 10 described herein, The each beam of the cross beam flexure pivot assembly 10 includes the beams having equal lengths and equal thicknesses and the beams are constructed of the same material.

Figure 2:
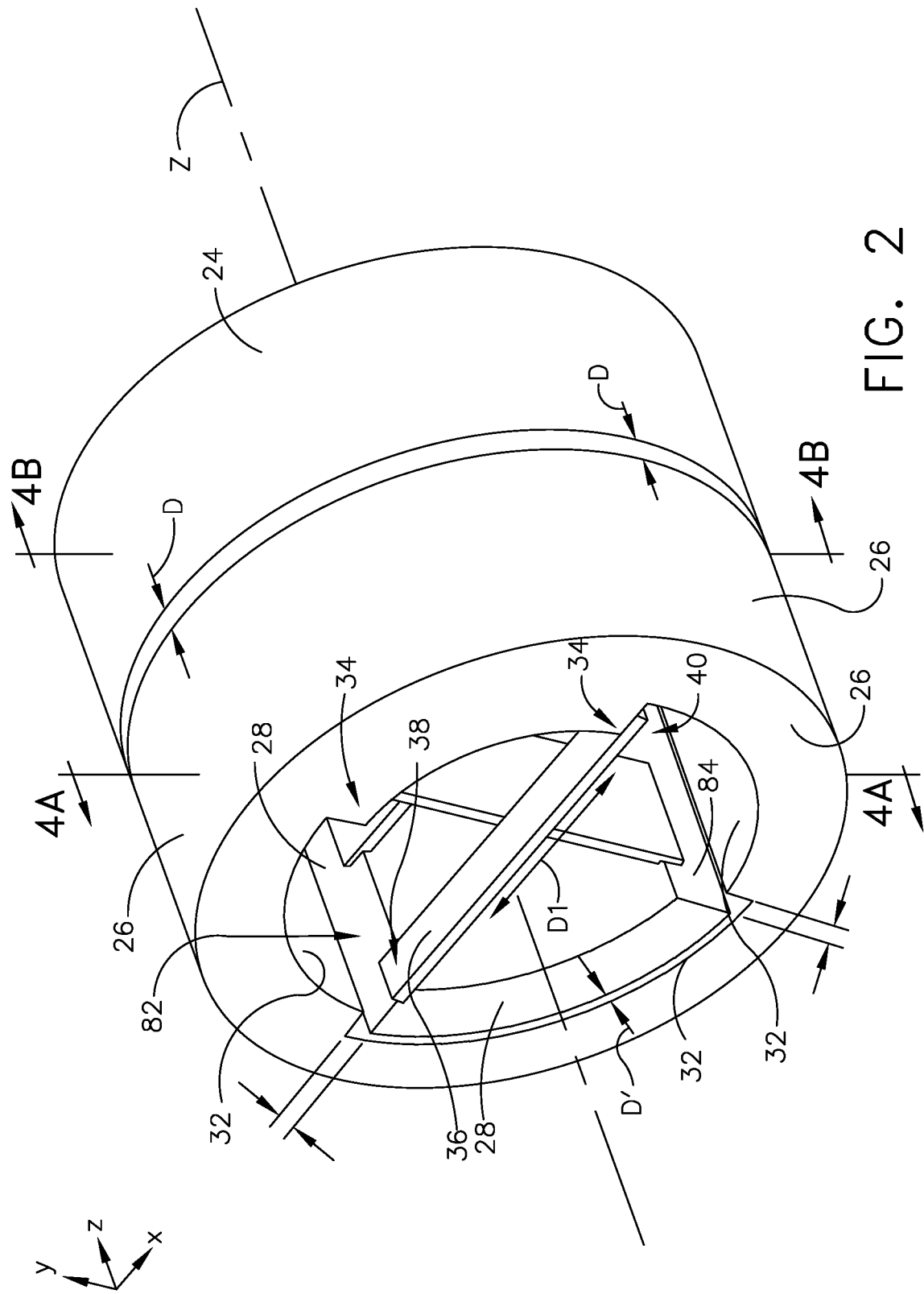
FIG. 2 is perspective end view of an end of the cross beam flexure pivot assembly, which connects to the rotatable mirror shown in FIG. 1.
Figure 3A:
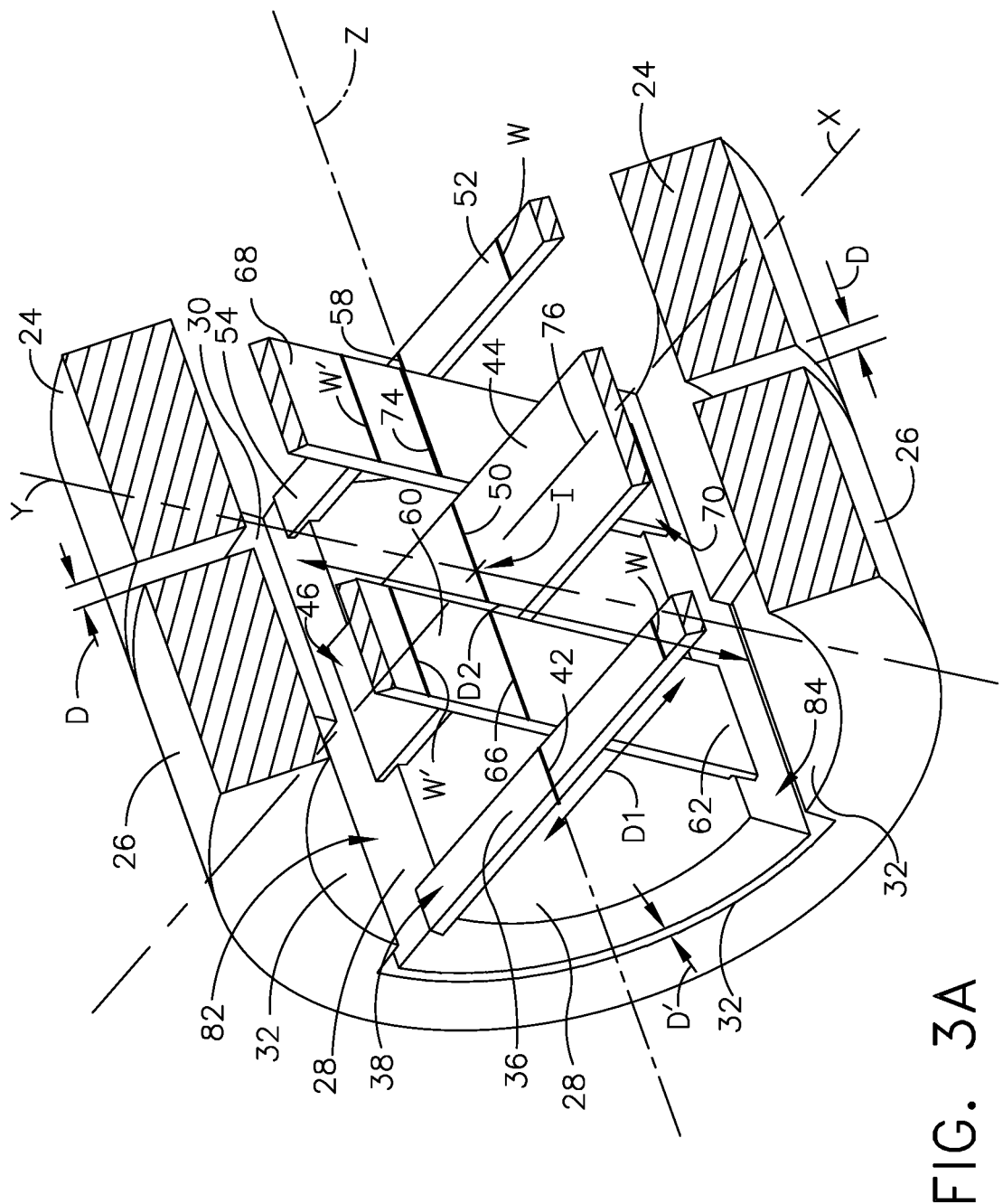
FIG. 3A is a partial broken away perspective end view of the cross beam flexure pivot assembly of FIG. 2 showing a first arcuate member of a first housing member of the cross beam flexure pivot assembly.
Figure 3B:
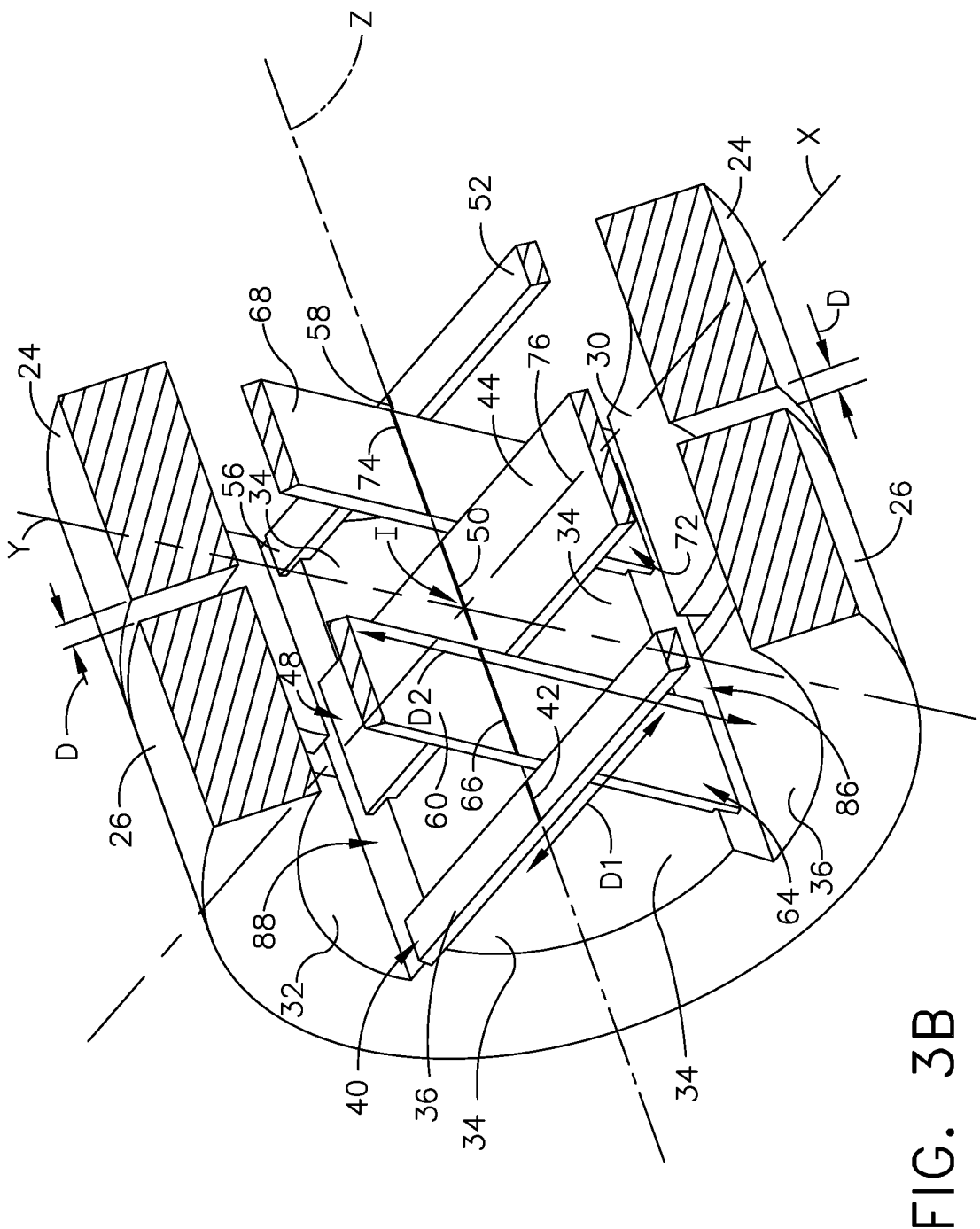
FIG. 3B is a partial broken away perspective end view of the cross beam flexure pivot assembly as shown in FIG. 2, with the flexure assembly of FIG. 3A rotated one hundred and eighty degrees about the Z-axis showing the second arcuate member of the flexure pivot assembly.
Figure 4A:
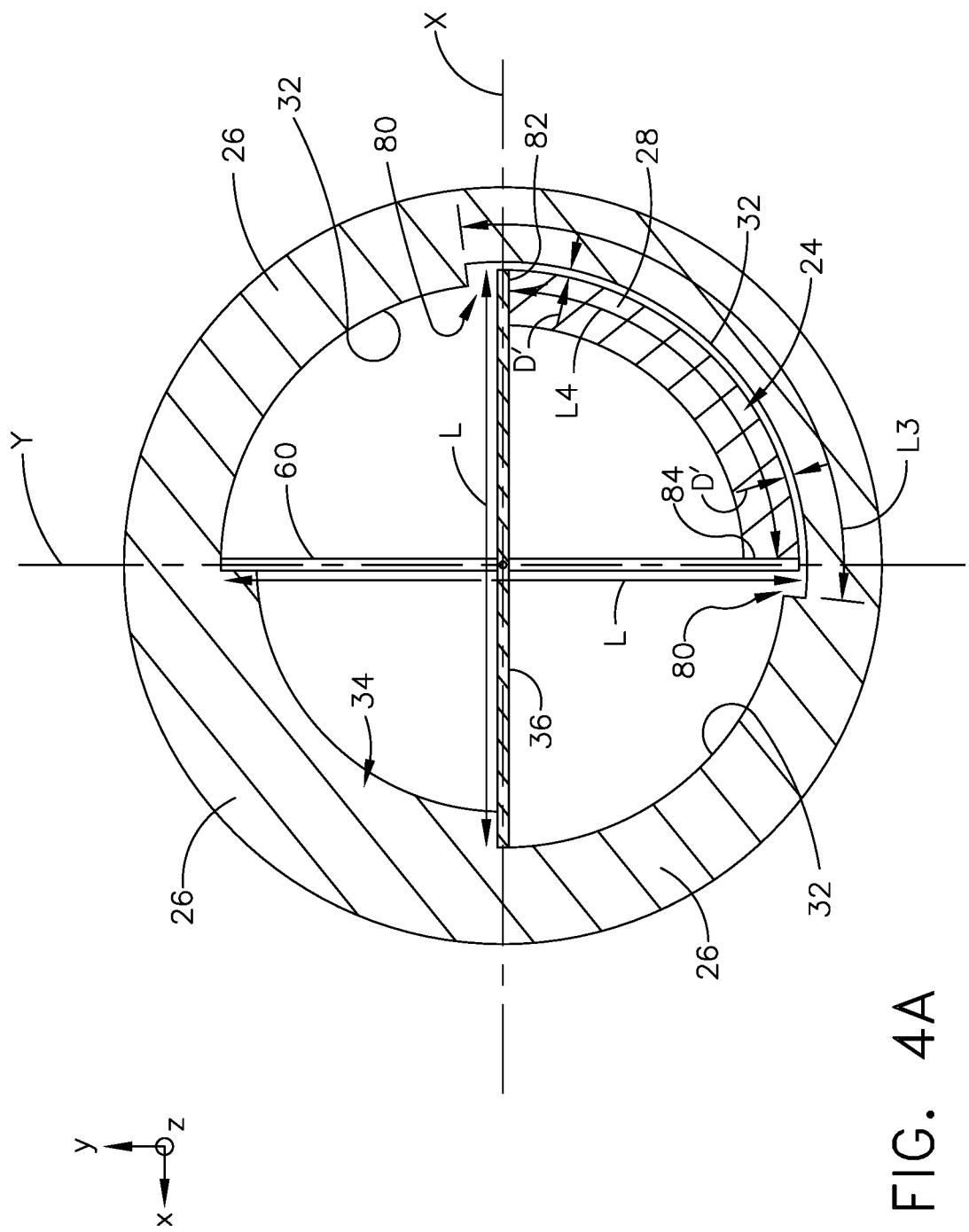
FIG. 4A is a cross section view of the flexure pivot assembly along line 4A-4A of FIG. 2.

In referring to FIGS. 2-4A, cross beam flexure pivot assembly 10 includes first housing member 24, which extends about Z axis or radial axis of cross beam flexure pivot assembly 10. Second housing member 26 extends about Z axis or radial axis with second housing member 26 positioned adjacent to and spaced apart from first housing member 24, distance D, along Z or radial axis, as seen in FIGS. 2-3B. This separation between first and second housing members 24, 26 reduces amount of contact and friction between first and second housing members 24, 26. First housing member 24 includes first arcuate member 28, which extends along first interior surface 30 of first housing member 24, as seen in FIGS. 3A and 4B. First arcuate member 28 extends from first housing member 24 to within second housing member 26 spaced apart distance D' from second interior surface 32 and along second interior surface 32 of second housing member 26, as seen in FIGS. 2, 3A and 4A. This configuration reduces amount of contact and friction between first arcuate member 28 and second housing member 26. Second housing member 26 includes second arcuate member 34 which extends along second interior surface 32 of second housing member 26, as seen in FIG. 3B. Second arcuate member 34 extends from second housing member 26 to within first housing member 24 spaced apart distance D" from first interior surface 30 of first housing member 24 and along first interior surface 30 of first housing member 24, as seen in FIGS. 3B and 4B.

First beam 36, as seen in FIGS. 2-3B, extends in first direction D1, in the same direction in this example as X direction and axis, with a first end 38 of first beam or beam 36 connected to first arcuate member 28. Second end 40 of first beam 36, as seen in FIG. 3B, is connected to second arcuate member 34 with Z axis or radial axis of cross beam flexure pivot assembly 10 extending through central axis 42 of first beam 36, as seen in FIGS. 3A-3B. Second beam 44, as seen in FIGS. 3A-3B, extends also in first direction D1 with first end 46, as seen in FIG. 3A, of second beam 44 connected to first arcuate member 28. Second end 48 of second beam 44, as seen in FIG. 3B, is connected to second arcuate member 34 with Z axis or radial axis of cross beam flexure pivot assembly 10 extending through central axis 50 of second beam 44, as seen in FIGS. 3A-3B. Second beam 44 is spaced apart along Z or radial axis of cross beam flexure pivot assembly 10 from first beam 36, as seen in FIGS. 3A-3B. Third beam 52, as seen in FIGS. 3A-3B, also extends in first direction D1 with first end 54 of third beam 52 connected to first arcuate member 28 and second end 56 of third beam 52 connected to second arcuate member 34, as seen in FIG. 3B with Z axis or radial axis of cross beam flexure pivot assembly 10 extending through central axis 58 of third beam as seen in FIGS. 3A-3B. Third beam 52 is spaced apart along Z or radial axis of cross beam flexure pivot assembly 10 from second beam 44.

Fourth beam 60 extends in second direction D2, in the same direction in this example as Y direction and axis transverse to first direction D1, having first end 62 of fourth beam 60 connected to first arcuate member 28, as seen in FIG. 3A. Second end 64 of fourth beam 60, as seen in FIG. 3B, is connected to second arcuate member 34 with Z or radial axis of cross beam flexure pivot assembly 10 extending through central axis 66 of fourth beam 60 with fourth beam 60 positioned between first and second beams 36, 44 respectively. Fifth beam 68 also extends in second direction D2 having first end 70 of fifth beam 68 connected to first arcuate member 28, as seen in FIG. 3A. Second end 72 is connected to second arcuate member 34, as seen in FIG. 3B, with Z or radial axis of cross beam flexure pivot assembly 10 extending through central axis 74 of fifth beam 68. Fifth beam 68 is positioned between second and third beams 44, 52 respectively.

Figure 6A:
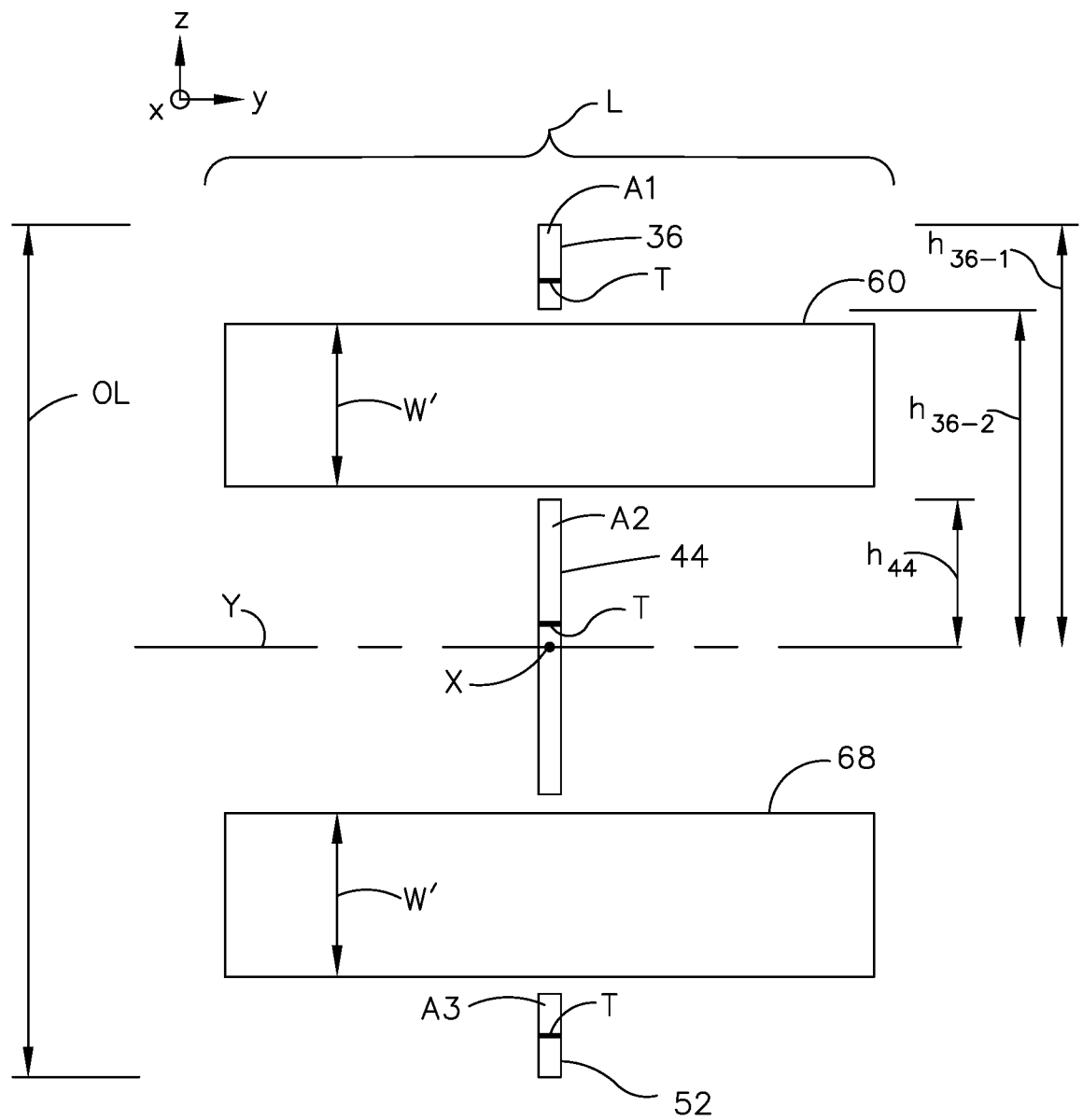
FIG. 6A is a schematic view of the area moments about the Y axis for the first, second and third beams for the cross beam flexure assembly of FIG. 3.
Figure 6B:
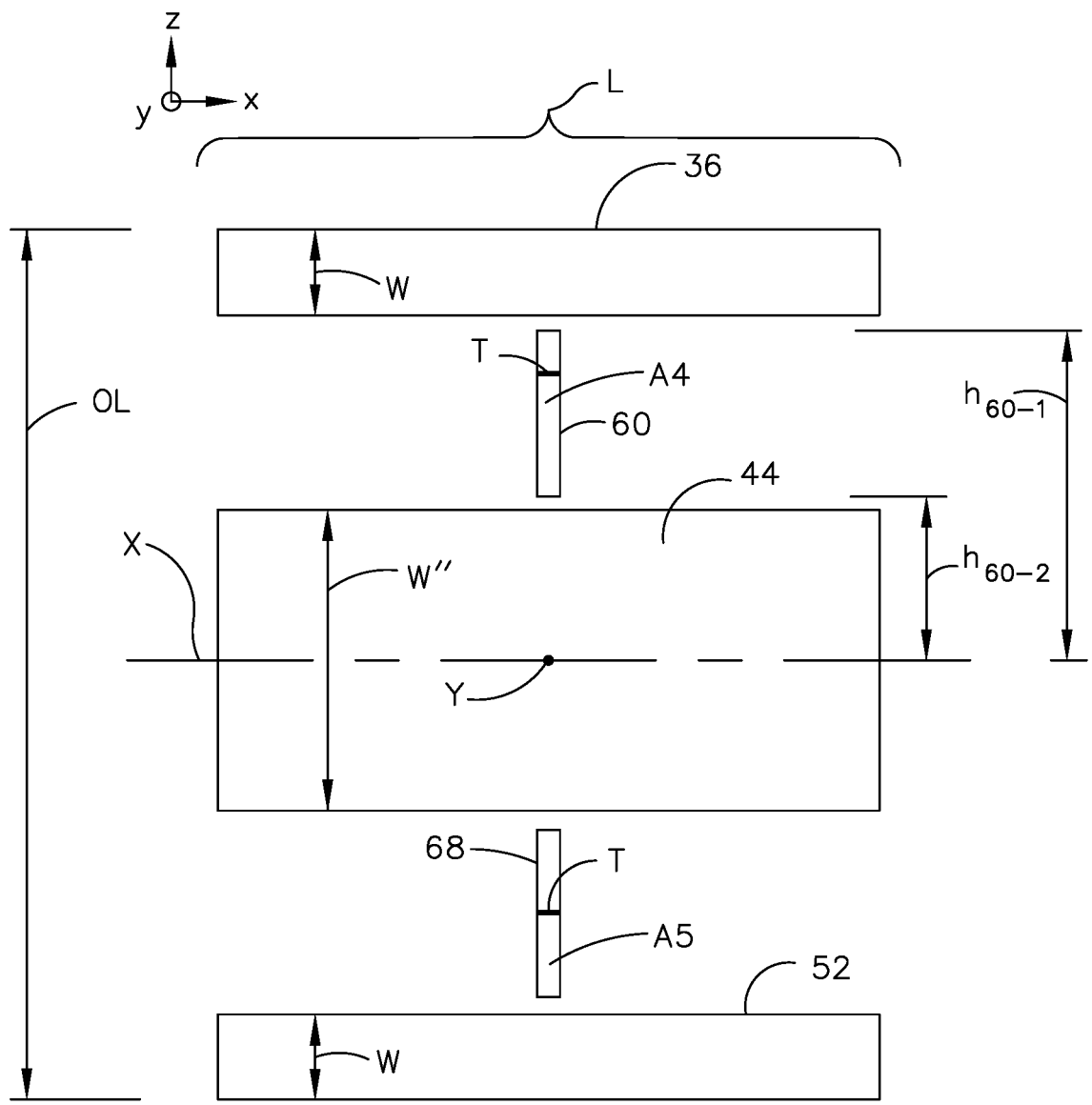
FIG. 6B is a schematic view of the area moments about the X axis for the fourth and fifth beams for the cross beam flexure assembly of FIG. 3.

In this example of cross beam flexure pivot assembly 10, configuration of the first, second, third, fourth and fifth beams 36, 44, 52, 60 and 68 respectively include lengths L which are of equal length. This can be seen for example in FIGS. 4A and 4B with respect to first, third, fourth and fifth beams 36, 52, 60 and 68. Second beam 44 has the same length L. Thickness T of each of first, second, third, fourth and fifth beams 36, 44, 52, 60 and 68 respectively are of equal thickness, as shown in FIGS. 6A and 6B.

First axis, which is designated as X axis, is positioned extending in first direction D1 through central axis 76, as seen in FIGS. 3A and 3B, of second beam 44. First or X axis intersects Z or radial axis of cross beam flexure pivot assembly 10 as seen in FIGS. 3A and 3B. Z or radial axis and first or X axis intersect within second beam 44. Second axis, which is designated as Y axis, is positioned extending in second direction D2 through second beam 44 intersecting Z axis or radial axis of the cross beam flexure pivot assembly 10 and intersects first or X axis, extending in first direction D1, at a common point of intersection I as seen in FIGS. 3A and 3B. The intersection of Z or radial axis, first or X axis and second or Y axis at common point of intersection I, results in this example with first, second, third, fourth and fifth beams 36, 44, 52, 60, and 68 respectively being symmetric to common point of intersection I.

Cross beam flexure pivot assembly 10 further includes first arcuate member 28 extending along first interior surface 30 of first housing member 24 and extending within second housing member 26 spaced apart from Z or radial axis. Second arcuate member 34 extends along second interior surface 32 of second housing member 26 and extends within first housing member 24 also spaced apart from the Z or radial axis.

Figure 4B:
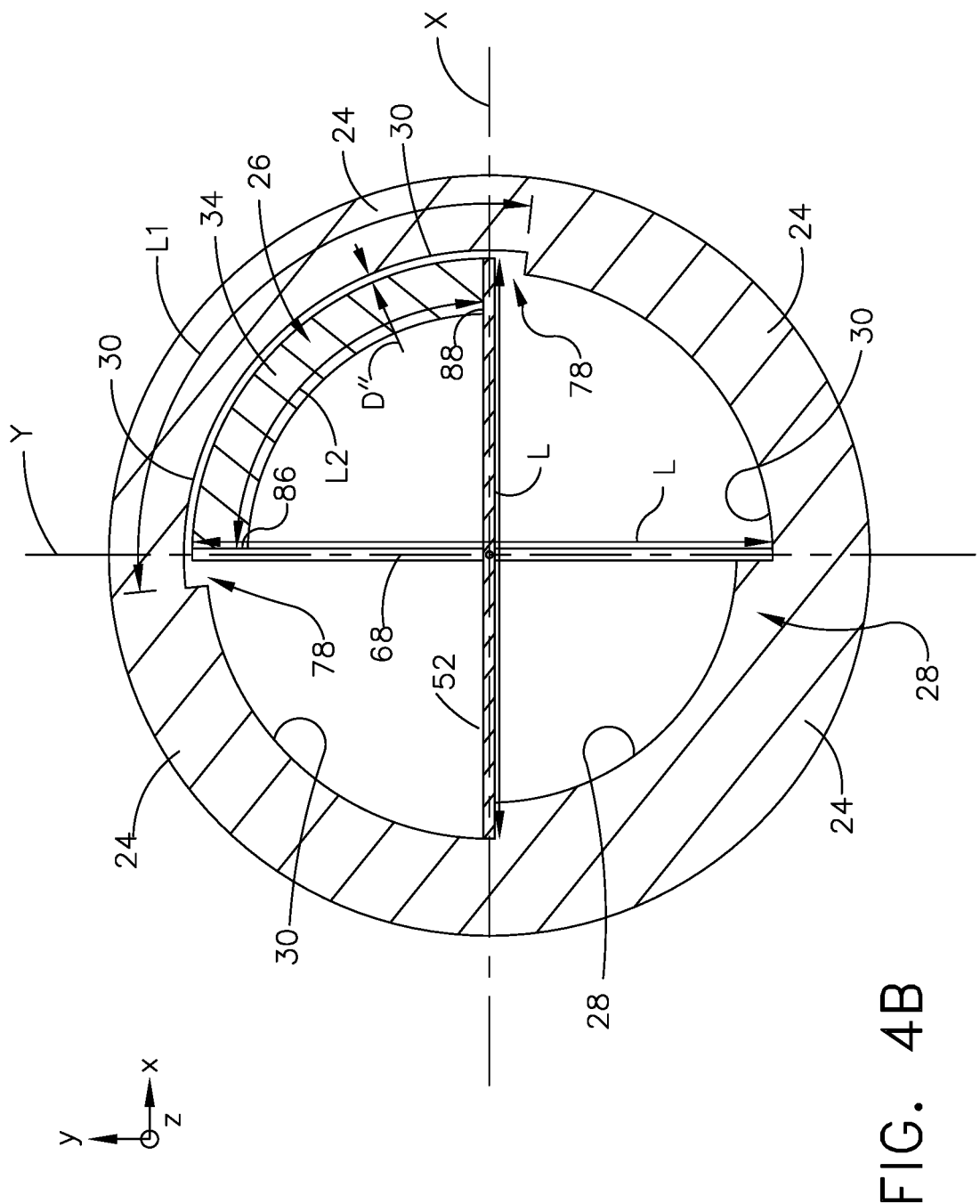
FIG. 4B is a cross section view of the flexure pivot assembly along line 4B-4B of FIG. 2.

Cross beam flexure pivot assembly 10 includes first housing member 24 defining first arcuate slot 78, as seen in FIG. 4B, which extends along Z or radial axis within first housing member 24. First arcuate slot 78 also extends about Z or radial axis having a first arcuate length L1, which is greater than second arcuate length L2 of second arcuate member 34, which extends about Z or radial axis, as seen in FIG. 4B. At least a portion of second arcuate member 34 is positioned within the first arcuate slot 78. With greater first arcuate length L1 of first arcuate slot 78 than second arcuate length L2 of second arcuate member 34, freedom of movement is provided for second arcuate member 34 within first arcuate slot 78.

Second housing member 26 defines second arcuate slot 80, as seen in FIG. 4A, which extends along Z or radial axis within second housing member 26. Second arcuate slot 80 extends about Z or radial axis having third arcuate length L3, which is greater than fourth arcuate length L4 of first arcuate member 28, which extends about Z or radial axis, as seen in FIG. 4A. At least a portion of first arcuate member 28 is positioned within second arcuate slot 80. With greater third arcuate length L3 of second arcuate slot 80 than fourth arcuate length L4 of first arcuate member 28, freedom of movement is provided for first arcuate member 28 within second arcuate slot 80.

Cross beam flexure pivot assembly 10 includes first arcuate member 28 positioned facing second arcuate member 34 and on an opposite side of Z or radial axis than second arcuate member 34, as seen in FIG. 2. Width W, in this example, for each of first beam 36 and third beam 52, which extends along Z or radial axis, as seen in FIG. 3A, are equal in width. Width W', in this example, for each of fourth and fifth beams 60, 68, which extend along the Z or radial axis are also equal in width. Thickness T, in this example, of each of the first, second, third, fourth and fifth beams are equal in thickness, as seen in FIGS. 6A and 6B.

First arcuate member 28, as seen in FIG. 4A, includes a first end 82 and a second end 84 positioned within second arcuate slot 80 within second housing member 26. First arcuate member 28 extends between first end 82 and second end 84 along second interior surface 32 within second housing member 26. In referring to FIG. 4B, second arcuate member 34 includes first end 86 and second end 88 positioned within first arcuate slot 78 within first housing member 24. As seen in FIGS. 3A and 4A, first end 38 of first beam 36, first end 46 of second beam 44 and first end 54 of third beam 52 are secured to first end 82 of first arcuate member 28. Second end 40 of first beam 36, second end 48 of second beam 44 and second end 56 of third beam 52 are secured to second end 88 of second arcuate member 34, as seen in FIGS. 3B and 4B First end 62 of fourth beam 60 and first end 70 of fifth beam 68 are secured to second end 84 of first arcuate member 28, as seen in FIGS. 3A and 4A. Second end 64 of the fourth beam 60 and second end 72 of fifth beam 68 are secured to first end 86 of second arcuate member 34, as seen in FIGS. 3B and 4B. In this example, first housing member 24 is in a fixed position and second housing member 26 has limited rotation, which is imparted to second housing member 26, in this example, by servo motor 14. With servo motor 14 imparting limited rotation to second housing member 26, first, second and third beams 36, 44 and 52, respectively and fourth and fifth beams 60 and 68, respectively flex maintaining limited rotation of first arcuate member 28 within second arcuate slot 80 and maintaining limited rotation of second arcuate member 34 within first arcuate slot 78.

First end 38, 46 and 54 and second end 40, 48 and 56, of each of first beam 36, second beam 44 and third beam 52, respectively are secured in the above described configuration to first and second arcuate members 28 and 34. The securement of each of first ends 38, 46 and 54 and second ends 40, 48 and 56 can be accomplished by various methodologies such as, for example, by one of integrally machined, brazed, welded, bonded or being bolted. First ends 62 and 70 and second ends 64 and 72 of each of fourth and fifth beams 60 and 68, respectively are secured in the above described configuration to first and second arcuate members 28 and 34. The securement of each of the first ends 62 and 70 and second ends 64 and 72 can be accomplished by various methodologies such as, for example, by one of integrally machined, brazed, welded, bonded or being bolted.

Cross beam flexure pivot assembly 10 provides obtaining maximum reliable and repeatable pointing performance of a cantilevered supported device, such as for example scanning mirror 12, and provides this performance with a given mass and volume restraint. Cross beam flexure pivot assembly 10 provides this performance by providing a linear stiffness in the X direction, with first beam 36, second beam 44 and third beam 52, equaling linear stiffness in the Y direction, with fourth beam 60 and fifth beam 68 and also providing moment stiffness about the first or X axis equaling moment stiffness about the second or Y axis.

Figure 5:
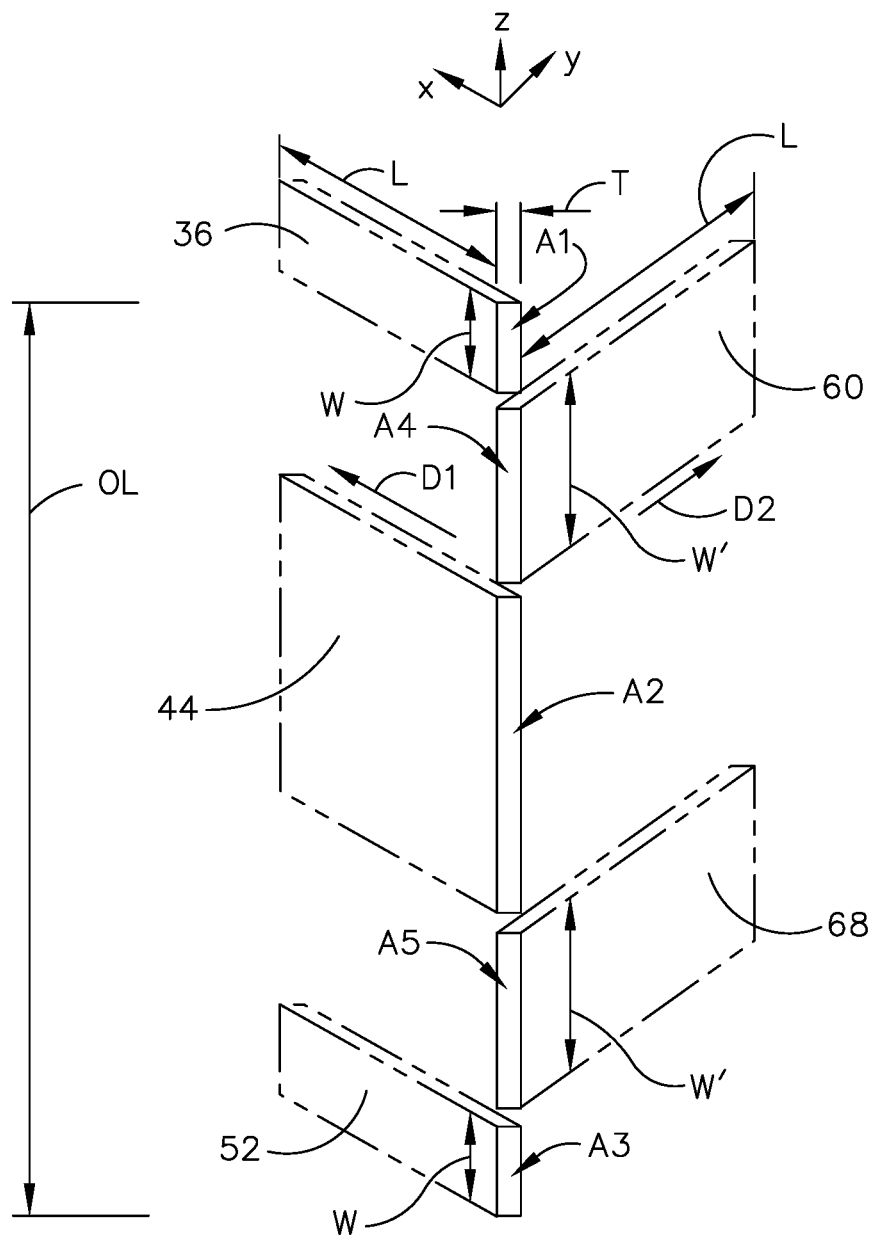
FIG. 5 is a schematic partial view of the beams of the cross beam flexure pivot assembly of FIG. 3, wherein a radial portion of the beams are shown extending from the Z or radial axis and a cross section of each beam is also shown.

With respect to linear stiffness in the X direction equaling linear stiffness in the Y direction, FIG. 5 shows a schematic representation with respect to overall length OL of cross beam flexure pivot assembly 10. In this example, thickness T for each of first, second, third, fourth and fifth beams 36, 44, 52, 60 and 68, respectively are of equal thickness and the length L for each of first, second, third, fourth and fifth beams 36, 44, 52, 60 and 68, respectively are equal in length. In addition in this example, first beam 36 and third beam 52 are equal in width W along Z or radial axis and fourth beam 60 and fifth beam 68 are equal in width W' in the Z or radial axis. Cross section area A1 equals cross section area A3 and cross section area A4 equals cross section area A5. Linear stiffness in first direction D1 or X direction equals linear stiffness in second direction D2 or Y direction with a sum total of cross section area A1 of first beam 36, cross section area A2 of second beam 44 and cross section area A3 of third beam 52 equaling a sum total of cross section area A4 of fourth beam 60 and cross section area A5 of fifth beam 68. With this configuration, cross beam flexure pivot assembly 10 has linear stiffness in the X direction which equals linear stiffness in the Y direction.

Cross beam flexure pivot assembly 10 provides optimum reliable and repeatable pointing performance of a cantilevered supported device, such as scanning mirror 12, and provides this performance with a given mass and volume restraint, with also providing moment stiffness about X axis equal to moment stiffness about Y axis. Providing moment stiffness about X axis equal to moment stiffness about Y axis is attained with a sum total of area moments about the first axis or X axis for first, second and third beams 36, 44 and 52 respectively equal to a sum total of area moments about the second axis or Y axis for each of the fourth beam 60 and fifth beam 68.

In referring to FIG. 6A, a sum total of area moments about the first axis or X axis, and in this example a neutral axis, is shown with respect to one side of the neutral or X axis and in referring to FIG. 6B, a sum total of area moments about the second axis or Y axis, and in this example a neutral axis, is shown with respect to one side of the neutral or Y axis. This configuration will provide a derivation of a percentage of width, which extends in the Z direction with respect to the overall length OL of cross beam flexure pivotal assembly 10, for each of first beam 36, second beam 44 and fourth beam 60. With first beam 36 and third beam 52 being equal in width W and fourth beam 60 and fifth beam 68 being equal in width W', all width dimensions of first, second, third, fourth and fifth beams 36, 44, 52, 60 and 68 are determinable.

In referring to FIG. 6A moment stiffness with X axis being the neutral axis is to be equal to the moment stiffness with Y axis being the neutral axis as seen in FIG. 6B. For purposes of both FIGS. 6A and 6B, the designation h refers to a distance to a neutral axis with the subsequent numerical designations referring to a particular beam member and a side of the beam member. For example, the designation $h_{36-1}$ refers to a distance from the neutral axis to first beam 36 and 1 refers to a side of first beam 36 most distal from the neutral axis. In another example, designation $h_{36-2}$ refers to a distance from the neutral axis to first beam 36 and 2 refers to a side of beam 36 which is closer to the neutral axis than side 1. In another designation $h_{44}$, $h_{44}$ refers to a distance between a neutral axis and an end of the beam which has only one side positioned on opposing sides of the neutral axis and as a result no further additional numerical designation is needed.

In referring to both FIGS. 6A and 6B, assumptions are made: $h_{36-1} >= h_{60-1}$ and $h_{60-2} >= h_{44}$. Equal moment stiffness in X and Y directions means equal area moments for each beam set, wherein in one beam set X axis is the neutral axis and in another beam set Y axis is the neutral axis. Thicknesses T and lengths L are constant for all beams and OL is overall length of cross beam flexure pivot assembly 10. Equal moment stiffness about X axis and Y axis means equal area moments for each beam set, wherein one beam set where X axis in FIG. 6A is the neutral axis and in the other beam set Y axis is the neutral axis, as seen in FIG. 6B, such that: $T*(h_{36-1})^3 - (h_{36-2})^3/12 + T*(h_{44})^3/12 = T*(h_{60-1})^3 - (h_{60-2})^3/12$ and with further simplifying: $(h_{60-1})^3 - (h_{60-2})^3 + (h_{44})^3 (h_{60-1})^3 (h_{60-2})^3$. For the simplest case, without spaces positioned between the beams, let $(h_{36-2}) = (h_{60-1})$ and, $(h_{60-2}) = (h_{44})$ and with thereafter simplifying $(h_{36-1}) + ^2(h_{44})^2 = 2(h_{60-1})$ and $(h_{36-1})^3 + 2(h_{44})^3 = 2(h_{60-1})^3$ the result is $(h_{36-1}) = OL/2$, first beam 36 which corresponds to area designation $A1 = (h_{36-1}) - (h_{60-1})$, fourth beam 60 which corresponds to area designation $A4 = (h_{60-1}) - (h_{44})$ and second beam 44 which corresponds to area designation $A2 = 2(h_{44})$.

The resulting derivation has fourth beam 60 which corresponds to area designation $A4 = OL/4$, wherein width W' for fourth beam 60 is twenty five percent (25%) of the overall length OL of cross beam flexure pivot assembly 10. Since fifth beam 68 has an equal width W', as fourth beam 60, fifth beam 68 width W' is also twenty five percent (25%) of the overall length OL of cross beam flexure pivot 10 assembly. Second beam 44, which corresponds to area designation $A2 = (5^{(1/2)} - 1)*OL/4$, has width W", as seen in FIG. 6B, which is thirty and nine tenths percent (30.90%) of overall length OL of cross beam flexure pivot assembly 10. First beam 36 which corresponds to area designation $A1 = (3 - 5^{(1/2)})*OL/8$, has width W for first beam 36 which is nine and fifty five one hundredths percent (9.55%) of the overall length OL for cross beam flexure pivot assembly 10. Since third beam 52 also has width W, as first beam 36, third beam 52 width W is also nine and fifty five one hundredths percent (9.55%) of overall length OL of cross beam flexure pivot assembly 10.

With utilizing five or more beams for cross beam flexure pivot assembly 10, balancing of the linear stiffness in the X and Y directions and balancing the moment of stiffness between the X and Y axes or directions provides optimum reliable and repeatable pointing performance of a cantilevered supported device and provides this performance with a given mass and volume restraint.

While various embodiments have been described above, this disclosure is not intended to be limited thereto. Variations can be made to the disclosed embodiments that are still within the scope of the appended claims.

What is claimed:

1. A cross beam flexure pivot assembly, comprising:
   a first housing member which extends about a radial axis of the cross beam flexure pivot assembly;
   a second housing member which extends about the radial axis with the second housing member positioned adjacent to and spaced apart along the radial axis from the first housing member; wherein:
   the first housing member comprises a first arcuate member which extends along a first interior surface of the first housing member;
   the first arcuate member extends from the first housing member to within the second housing member spaced apart from and along a second interior surface of the second housing member;

the second housing member comprises a second arcuate member which extends along the second interior surface of the second housing member; and the second arcuate member extends from the second housing member to within the first housing member spaced apart from and along the first interior surface of the first housing member;

a first beam extends in a first direction with a first end of the first beam connected to the first arcuate member and a second end connected to the second arcuate member and with the radial axis of the cross beam flexure pivot assembly extending through a central axis of the first beam;

a second beam extends in the first direction with a first end of the second beam connected to the first arcuate member and a second end connected to the second arcuate member, with the radial axis of the cross beam flexure pivot assembly extending through a central axis of the second beam and with the second beam spaced apart along the radial axis of the cross beam flexure pivot assembly from the first beam;

a third beam extends in the first direction with a first end of the third beam connected to the first arcuate member and a second end connected to the second arcuate member, with the radial axis of the cross beam flexure pivot assembly extending through a central axis of the third beam and with the third beam spaced apart along the radial axis of the cross beam flexure pivot assembly from the second beam;

a fourth beam extends in a second direction transverse to the first direction having a first end of the fourth beam connected to the first arcuate member and a second end connected to the second arcuate member, with the radial axis of the cross beam flexure pivot assembly extending through a central axis of the fourth beam and with the fourth beam positioned between the first and second beams;

a fifth beam extends in the second direction having a first end of the fifth beam connected to the first arcuate member and a second end connected to the second arcuate member, with the radial axis of the cross beam flexure pivot assembly extending through a central axis of the fifth beam, with the fifth beam positioned between the second and third beams and with a first axis positioned extending in the first direction through a central axis of the second beam, which intersects the radial axis of the cross beam flexure pivot, and a second axis positioned extending in the second direction, wherein:

the radial axis, the first axis and the second axis form a common point of intersection which results in the first, second, third, fourth and fifth beams being symmetric to the common point of intersection;

a sum total of a cross section area of the first beam, a cross section area of the second beam and a cross section area of the third beam equals a sum total of a cross section area of the fourth beam and a cross section area of the fifth beam, which provides equal linear stiffness in the first direction and in the second direction; and a sum total of area moments about the first axis for the cross section area of each of the first beam, the second beam and the third beam equals a sum total of area moments about the second axis for the cross section area of each of the fourth beam and the fifth beam, which provides equal moment stiffness about the first axis and the second axis.

2. The cross beam flexure pivot assembly of claim 1, further includes the first arcuate member extends along the first interior surface of the first housing member and extends within the second housing member spaced apart from the radial axis.

3. The cross beam flexure pivot assembly of claim 1, further includes the second arcuate member extends along the second interior surface of the second housing member and extends within the first housing member spaced apart from the radial axis.

4. The cross beam flexure pivot assembly of claim 1, wherein the first housing member defines a first arcuate slot, which extends along the radial axis.

5. The cross beam flexure pivot assembly of claim 4, wherein the first arcuate slot extends about the radial axis having a first arcuate length, which is greater than a second arcuate length of the second arcuate member, which extends about the radial axis.

6. The cross beam flexure pivot assembly of claim 5, wherein at least a portion of the second arcuate member is positioned within the first arcuate slot.

7. The cross beam flexure pivot assembly of claim 1, wherein the second housing member defines a second arcuate slot, which extends along the radial axis.

8. The cross beam flexure pivot assembly of claim 7, wherein the second arcuate slot extends about the radial axis having a third arcuate length, which is greater than a fourth arcuate length of the first arcuate member, which extends about the radial axis.

9. The cross beam flexure pivot assembly of claim 8, wherein at least a portion of the first arcuate member is positioned within the second arcuate slot.

10. The cross beam flexure pivot assembly of claim 1, wherein the first arcuate member is positioned facing second arcuate member and on an opposite side of the radial axis than second arcuate member.

11. The cross beam flexure pivot assembly of claim 1, wherein:

a width for each of the first beam and the third beam, which extend along the radial axis are of equal width; and a width for each of the fourth and fifth beam, which extend along the radial axis, are of equal width.

12. The cross beam flexure pivot assembly of claim 11, wherein:

a length of each of the first, second, third, fourth and fifth beams are of equal length;

a thickness of each of the first, second, third, fourth and fifth beams is of equal thickness; and the first, second, third, fourth and fifth beams are symmetric to the common point of intersection.

13. The cross beam flexure pivot assembly of claim 1, wherein the first arcuate member includes a first end and a second end positioned within a second arcuate slot within the second housing member.

14. The cross beam flexure pivot assembly of claim 13, further includes first arcuate member extends between the first end and second end along second interior surface within the second housing member.

15. The cross beam flexure pivot assembly of claim 13, wherein a second arcuate member includes a first end and a second end positioned within a first arcuate slot within the first housing member.

16. The cross beam flexure pivot assembly of claim 15, further includes a first end of the first beam, a first end of the second beam and a first end of the third beam are secured to a first end of the first arcuate member.

17. The cross beam flexure pivot assembly of claim 16, further includes a second end of the first beam, a second end of the second beam and a second end of the third beam are secured to the second end of the second arcuate member.

18. The cross beam flexure pivot assembly of claim 17, further includes a first end of the fourth beam and a first end of the fifth beam are secured to a second end of the first arcuate member.

19. The cross beam flexure pivot assembly of claim 18, further includes a second end of the fourth beam and a second end of the fifth beam are secured to second end of the second arcuate member.

20. The cross beam flexure pivot assembly of claim 19, wherein:
- the first end and the second end, of each of the first beam, second beam and the third beam, are secured to the first and second arcuate members respectively by one of integrally machined, brazed, welded, bonded or bolted; and
- the first end and the second end, of each of the fourth and fifth beams, are secured to the first and second arcuate members respectively by one of integrally machined, brazed, welded, bonded or bolted.

* * * * *